United States Patent Office 2,794,377
Patented June 4, 1957

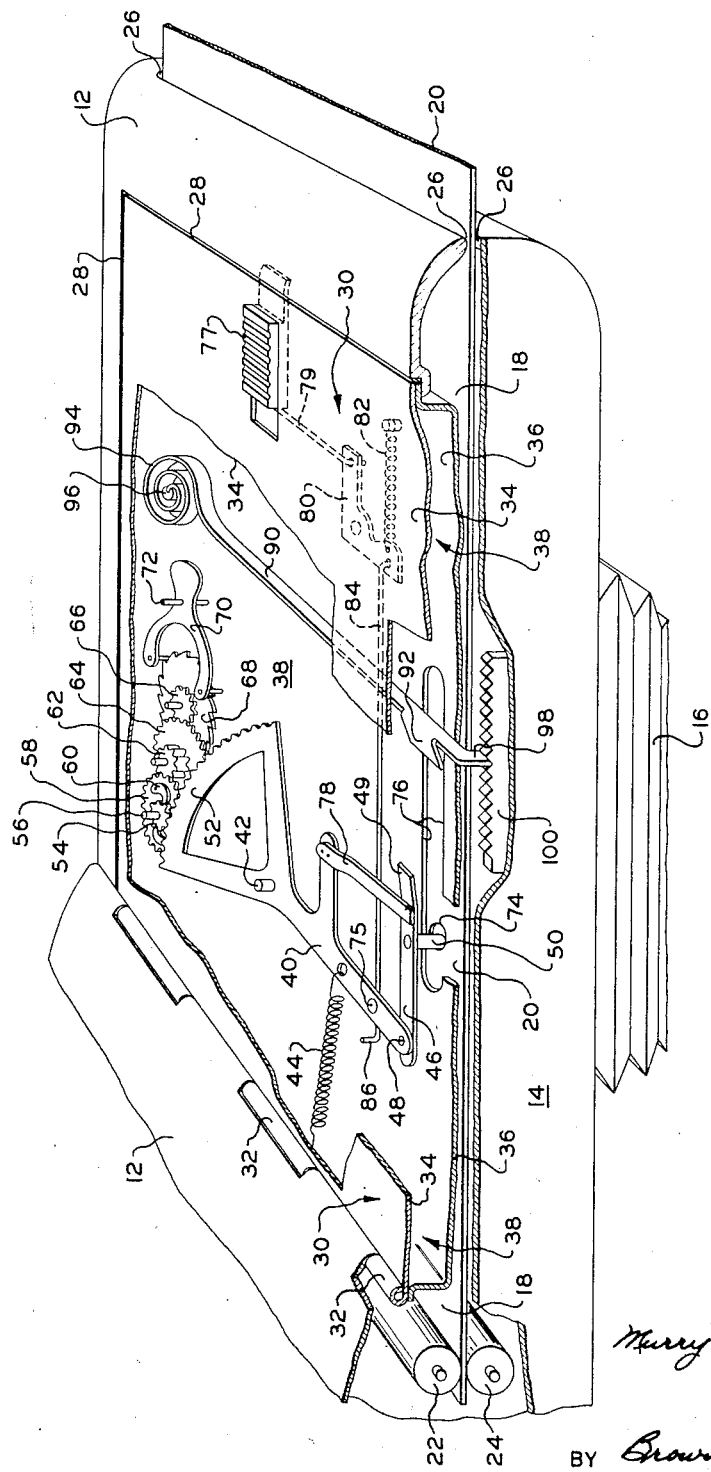

2,794,377

SELF-DEVELOPING CAMERA, INCLUDING TEMPERATURE-COMPENSATED TIMING MEANS

Murry N. Fairbank, Belmont, Mass., assignor to Polaroid Corporation, Cambridge, Mass., a corporation of Delaware Application May 12, 1954, Serial No. 429,286

11 Claims. (Cl. 95—13)

This invention relates to photography and, more particularly, to apparatus for exposing and processing photosensitive sheet material.

Photographic apparatus has been proposed wherein a first sheet of photosensitive material is exposed and thereafter processed by superposing the first sheet with a second sheet and spreading a liquid processing composition between the superposed sheets. Such apparatus generally includes means for superposing the first and second sheets and spreading the liquid processing composition therebetween, and a lighttight imbibition chamber into which the sandwich formed of the first and second sheets and the layer of processing composition may be advanced for a predetermined processing period. The predetermined processing may, preferably, include a diffusion transfer reversal process for forming in the second sheet a positive image of a latent image in the first sheet, the first and second sheets being stripped apart at the end of the processing period. Since it is desirable that the duration of this period be accurately timed and because the length of said period varies with the temperature of the sheet material and the processing composition, it is essential that the operator of the camera not only provide himself with a timekeeping means but that he be able to determine the temperature of the photographic materials in order to adjust the duration of the processing period accordingly.

It is an object of the present invention to provide an improved camera of the above type which includes a novel device, actuated by advancement of the sheet materials between the liquid-spreading means and movement of the sandwich formed thereby into the imbibition chamber, for timing duration of the predetermined processing period, and indicating to the operator when said period has elapsed.

Another object of the present invention is to provide, in such a camera, an inexpensive and accurate timing device of the above type which includes means for automatically adjusting the duration of the processing period to compensate for variations in temperature.

A further object of the present invention resides in the provision in such a camera of means associated with the timing device for permitting access to the imbibition chamber and stripping of the first and second sheets from one another only after completion of a predetermined processing period determined by said device.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing, which is a diagrammatic, perspective view, partially in section and with parts broken away, of a camera embodying the present invention.

There is illustrated in the drawing the rear portion of a camera of the self-developing type wherein a first sheet of photosensitive material is exposed and thereafter processed by being advanced into superposition with a second sheet with a thin layer of processing composition spread between the sheets. The camera includes a housing, means for mounting supplies of the first and second sheets within the housing, means for exposing an area of the first sheet, means for superposing the exposed area of the first sheet on the second sheet and spreading a layer of liquid processing composition between the sheets, and a lighttight imbibition chamber into which a sandwich comprising the sheets and layer of processing composition may be advanced, and wherein said sandwich is allowed to remain for a predetermined processing period. Such cameras, now well known in the art, are described in Patents Nos. 2,435,717, issued February 10, 1948, to Edwin H. Land for Developing Camera Utilizing a Film, Another Sheet Material, and a Fluid Processing Agent, and 2,455,111, issued November 30, 1948, to Joseph F. Carbone et al. for Self-Developing Camera.

The camera housing includes a rear wall 12, two side walls one of which is indicated at 14, and a front wall (not shown) on which may be mounted suitable exposure means including, for example, a bellows 16. Underlying rear wall 12 is an imbibition chamber 18 into which a sandwich indicated at 20 comprised of a photosensitive sheet, a second sheet and a layer of processing liquid may be advanced during processing.

In a preferred form of camera, the first and second sheets are superposed and the layer of processing liquid is spread between the sheets by a pair of pressure-applying members, for example, a pair of rollers 22 and 24 resiliently urged toward one another. Rollers 22 and 24 are mounted adjacent one end of imbibition chamber 18 and the sheets comprising sandwich 20 are advanced between the rollers directly into the imbibition chamber. In order to advance the sheet materials through the camera and into imbibition chamber 18, various means may be provided. For example, the pressure-applying rollers may be rotated or, as shown in the drawing, sandwich 20 may be drawn through the camera manually. In such a camera, chamber 18 is provided with an exit passage 26 in its end opposite pressure-applying rollers 22 and 24, portions of sandwich 20 being adapted to be grasped by the operator for drawing the sheets through the camera.

The superposed first and second sheets are advanced into imbibition chamber 18 and allowed to remain therein for a predetermined processing time. During this time, in a preferred form of the invention, a positive photographic print may be formed in the second sheet by a diffusion transfer reversal process and at the end of this time the two sheets are stripped apart. To facilitate stripping of a positive print from the first sheet, the area of the second sheet in which the print is formed may be precut or perforated around its margins to facilitate tearing said area from remaining portions of the sheet. Rear wall 12 is provided with an aperture 28 communicating with imbibition chamber 18 and a door 30 mounted at hinge 32 adapted to close said aperture and render chamber 18 lighttight. At the end of the processing period, door 30 may be opened, permitting the operator to strip the positive photographic print from the first sheet. Door 30 may then be closed and portions of sandwich 20 extending through aperture 28 may be grasped by the operator for drawing the sheets through the apparatus and another sandwich into imbibition chamber 18.

Door 30 comprises an outer wall 34 and an inner wall 36 spaced from the outer wall to provide a chamber 38 in which the elements of a timing device may be mounted and housed.

In order to provide for proper processing of the first sheet or, in a diffusion transfer process, to prevent under- or over-development of a positive image of the second sheet, it is essential that the processing time be accurately predetermined and controlled. As a consequence, the desirability of incorporating a timing device into the camera becomes readily apparent. The present invention is primarily directed toward the provision of a timing device which is simple and inexpensive, reasonably accurate and sufficiently compact to fit within the limited space available in a handheld camera. Further still, the timing device is substantially automatic in its operation, being coupled with the mechanism of the camera and actuated, for example, by movement of the sheet materials through the camera.

The timing device comprehended by the present invention comprises an operating lever 40 pivotally mounted on a shaft 42 between walls 34 and 36 of door 30 and illustrated in a position during initial movement from its normal position of rest prior to actuation of the timing device. Lever 40 is resiliently urged in a clockwise direction (viewing the drawing) by a tension spring 44 secured at its ends to lever 40 and door 30. Lever 40 is provided with an actuating arm 46 pivotally secured to one end at 48. Actuating arm 46 extends substantially parallel to the direction of movement of sandwich 20, through imbibition chamber 18 and includes a curved-up or ramp-like end portion 49 and a pin 50 secured mediate its ends. The other end of lever 40 comprises a sector gear 52 in engagement with a pinion 54 secured to a shaft 56 mounted between walls 34 and 36. Mounted on shaft 56 is a gear 58 having pawls 60 adapted to engage pinion 54 and effect the rotation of gear 58 when pinion 54 is rotated in a counterclockwise direction by the action of lever 40 rotating in a clockwise direction. Gear 58 is connected in turn through pinion 62, gear 64 and pinion 66 to a ratchet wheel 68, the latter comprising one component of a conventional escapement mechanism which includes a pallet 70 mounted on shaft 72.

The timing device is actuated by pivoting operating lever 40 in a counterclockwise direction against the bias of spring 44 and then releasing the lever for rotation in a clockwise direction. The speed of rotation of lever 40 in a clockwise direction under the bias of spring 44 is then controlled by the aforesaid escapement mechanism.

To facilitate actuation of the timing device by movement of the sheet materials through the apparatus, there are provided suitable engagement means, such as a perforation 74, in the sheets adapted to engage pin 50. Pin 50 extends through an elongated slot 76 in inner wall 36 extending in a direction of movement of sandwich 20 and defining the limit of movement of pin 50 and lever 40. In order to hold pin 50 in engagement with the sandwich 20 and perforation 74, there is provided a leaf spring 78 secured at one end to a portion of lever 40 and with its other end bearing against actuating arm 46. Perforations 74 are located in the sheets so as to advance in alignment with slots 76 and, as sandwich 20 is advanced through imbibition chamber 18, pin 50 rides on the surface of the sandwich until a perforation 74 becomes aligned with the pin engaging the latter and moving it in the direction of advancement of the sandwich until pin 50 is withdrawn from engagement with perforation 74.

In another form of the invention, means may be provided for utilizing the rotation of rollers 22 and 24 caused by advancement of the sheet material between them for actuating the timing device. Such means may include a sprocket mounted on one of the rollers, an idler sprocket mounted on side wall 14 of the camera housing, and a continuous drive chain connecting the sprockets. Pin 50 may be adapted to engage one of the links of the drive chain as the rollers are rotated by movement of the sheet material between them in order to pivot operating lever 40 and may be disengaged from the chain at a predetermined point.

The duration of the processing period is determined by the time required for lever 40 to rotate under the bias of spring 44 to its normal or original position of rest after it has been released from engagement with perforation 74. The time required for the return of lever 40 is functionally related to the constant speed permitted by the escapement mechanism and the angle through which lever 40 must rotate in returning to its position of rest. It is apparent, therefore, that the duration of the processing period may be varied by controlling the length of travel of pin 50 in engagement with perforation 74, i. e., the point at which said pin is released from engagement with said perforation.

Means may be provided for indicating to the operator that the predetermined processing period, measured by the timing device, has elapsed. Such means may include, for example, means which make a buzzing sound as long as the timing device is operating and stops at the end of the processing period, a suitable audible signalling device such as a bell which sounds at the end of the processing period, or suitable indicia 75 on lever 40 and a window (not shown) in outer wall 34 so located as to make indicia 75 visible when lever 40 has returned to its original position of rest.

In a preferred form of the invention illustrated in Fig. 1 the timing device is adapted to release a latch 77, normally holding door 30 in its closed position, at the end of the processing period. The latch-releasing means includes a locking member 79 normally in engagement with latch 77 to prevent movement of the latter into inoperative position. Locking member 79 is attached to one arm of a pivotally mounted bell crank 80, a tension spring 82 being attached to the bell crank for urging rotation of the latter and movement of locking member 79 into latch-locking position. An elongated release member 84 is attached to the other arm of bell crank 80 and is provided with a turned-up end 86 engageable by lever 40. As lever 40 returns to its original position, it engages end 86 of member 84, rotating bell crank 80 against the bias of spring 82 and thereby withdrawing locking member 79 from engagement with latch 77, thus permitting the latter to be moved into unlocked position. By virtue of this arrangement, the operator is prevented from opening door 30 prior to completion of the processing of the sheets, thereby precluding any possibility of exposure of the first sheet prior to completion of the processing.

As a means for determining the duration of the period measured by the timing device by controlling the point at which pin 50 is disengaged from a perforation 74 in the sheet material, there is provided an elongated arm 90 having a turned-down tab portion 92. The curved-up end portion 49 of actuating arm 46 is adapted to ride up the ramp formed by tab 92, thereby moving pin 50 out of engagement with perforation 74. It is apparent, therefore, that the counterclockwise rotation of lever 40 and the point at which pin 50 is withdrawn from engagement with perforations 74 is controlled by the position of arm 90.

The temperature of the sheet material, processing liquid and the camera effects the time required for processing the sheet materials or for forming a positive image in the second sheet. In a particular combination of sheet material and processing liquid for example, the required processing time at 68° F. is one minute and may vary from 40 seconds at 100° F. to 5 minutes at 32° F. The timing device includes means responsive to temperature for varying the processing period measured by the timing device, and, in the form shown, this means comprises forming arm 90 of a suitable bi-metallic material into a coil 94 and securing said coil to a pin 96. The bi-metallic material and coil 94 are so constructed and arranged that at high temperatures arm 90 pivots toward lever 40 and at lower temperatures pivots away from lever 40, thereby varying the point at which pin 50 is disengaged from perforation 74. In order to hold arm 90 stationary at a fixed position when end 49 of actuating arm 46 engages tab 92, arm 90 is provided with an angular engagement portion 98 at its end adapted to engage the teeth of a rack 100 secured to side wall 14 of the camera housing. When door 30 is opened, engagement portion 98 is disengaged from rack 100, permitting arm 90 to assume a position dependent upon temperature, and when door 30 is closed, engagement portion 98 is engaged by the teeth of rack 100 and arm 90 is thereby retained in the aforesaid position during actuation of the timing device.

Although the timing device automatically compensates for temperature variation to assure a predetermined optimum processing of the sheet material, it may be desirable to increase or decrease this optimum processing period by certain amounts in order, for example, to under-develop and over-develop the positive image. To permit a prescribed variation in the processing period measured by the timing device, rack 100 may be mounted for movement parallel to the direction of movement of sandwich 20. Thus, when door 30 is closed and portion 98 of arm 90 is engaged with the teeth of rack 100, the latter may be moved by the operator in order to increase or decrease the optimum processing time by any definite amount. Suitable indicia may be provided for indicating to the operator the distance rack 100 must be moved in order to vary the processing period by any particular amount.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In a camera for exposing and processing a photosensitive sheet material, the combination of means defining a processing chamber into which said sheet material is advanced during processing, door means providing access to said processing chamber, said door means including means defining a chamber movable with respect to said processing chamber, and timing means housed within the last-mentioned chamber for measuring a predetermined processing period during which said sheet material is processed, said timing means including rotary means, spring means urging rotation of said rotary means in one direction, actuating means responsive to the movement of said sheet material through said camera for causing said rotary means to be rotated in another direction against the bias of said spring means, said actuating means including a member engageable with a portion of said sheet material as it is advanced through said processing chamber, means for controlling the angle of rotation of said rotary means in said other direction, said control means including means for withdrawing said member from engagement with said portion of said sheet material and thereby permitting said rotary means to rotate in said other direction under the bias of said spring means, said control means being responsive to variations in temperature for varying the point at which said member is withdrawn from engagement with said portion of said sheet material, means associated with said means defining said processing chamber for rendering said control means nonresponsive to temperature variations when said door means is in closed position, means controlling the rate of rotation of said rotary means in said one direction, and means indicating to the operator of said camera when said processing period has elapsed.

2. In a camera for exposing and processing a photosensitive sheet material, the combination of means defining a processing chamber into which said sheet material is advanced during processing, door means providing access to said processing chamber, said door means comprising an inner wall and an outer wall constituting a chamber between said walls, timing means housed within the last-mentioned chamber for measuring a predetermined processing period during which said sheet material is processed, said timing means including rotary means, spring means urging rotation of said rotary means in one direction, actuating means responsive to the movement of said sheet material through said camera for causing said rotary means to be rotated in another direction against the bias of said spring means, said actuating means including a member projecting through a slot in said inner wall and engageable with a portion of said sheet material as it is advanced through said processing chamber, means for controlling the angle of rotation of said rotary means in said other direction, said control means including means for withdrawing said member from engagement with said portion of said sheet material and thereby permitting said rotary means to rotate in said other direction under the bias of said spring means, said control means being responsive to variations in temperature for varying the point at which said member is withdrawn from engagement with said portion of said sheet material, engagement means associated with said means defining said processing chamber, said engagement means being adapted to engage said control means when said door is in closed position, escapement means controlling the rate of rotation of said rotary means in said one direction, and means indicating to the operator of said camera when said processing period has elapsed.

3. The camera of claim 2 wherein said actuating means includes an arm connected at one end with said rotary means and curved at its other end, and a pin secured to said arm mediate its ends and adapted to project through said slot in said inner wall and engage a portion of said sheet material, said curved end of said arm coacting with a portion of said control means for withdrawing said pin from engagement with said portion of said sheet material.

4. In the camera of claim 2, latch means for holding said door means in closed position, locking means for holding said latch means in locked position during the rotation of said rotary means, and means cooperating with said rotary means for releasing said locking means as said rotary means returns to its original position.

5. In a camera for exposing and processing a photosensitive sheet material, timing means for measuring a predetermined period during which said sheet material is processed, said timing means including means movable in at least two directions, resilient means urging movement of said movable means in one direction, means responsive to the movement of said sheet material through said camera for causing movement of said movable means in another direction against the bias of said resilient means, means for controlling the extent of movement of said movable means in said other direction, said means for controlling the extent of said movable means in said other direction being responsive to variations in temperature for varying the extent of movement of said movable means inversely as the temperature, means for controlling the rate of movement of said movable means in said one direction under the bias of said resilient means, and means indicating to the operator of said camera when said processing period has elapsed.

6. In a camera for exposing and processing a photosensitive sheet material, timing means for measuring a predetermined period during which said sheet material is processed, said timing means including rotary means, spring means urging rotation of said rotary means in one direction, means responsive to the movement of said sheet material through said camera for causing said rotary means to be rotated in another direction against the bias of said spring means, means for controlling the angle of rotation of said rotary means in said other direction, said means for controlling the angle of rotation of said rotary means in said other direction being responsive to variations in temperature for varying said angle of rotation inversely as the temperature, escapement means for controlling the rate of rotation of said rotary means in said one direction under the bias of said spring means, and means indicating to the operator of said camera when said processing period has elapsed.

7. In a camera for exposing and processing a photosensitive sheet material, timing means for measuring a predetermined period during which said sheet material is processed, said timing means including rotary means, spring means urging rotation of said rotary means in one direction, actuating means responsive to the movement of said sheet material through said camera for causing said rotary means to be rotated in another direction against the bias of said spring means, said actuating means including a member engageable with a portion of said sheet material as it is advanced through said camera, means for controlling the angle of rotation of said rotary means in said other direction, said means for controlling the rotation of said rotary means in said other direction being responsive to variations in temperature for varying said angle of rotation inversely as the temperature, said control means including means for releasing said member from engagement with said portion of said sheet material and thereby permitting said rotary means to rotate in said one direction under the bias of said spring means, means for controlling the rate of rotation of said rotary means in one direction, and means indicating to the operator of said camera when said processing period has elapsed.

8. In a camera for exposing and processing a photosensitive sheet material, pressure-applying means including a pair of rollers between which said sheet material is advanced, timing means for measuring a predetermined period during which said sheet material is processed, said timing means including rotary means, resilient means urging rotation of said rotary means in one direction, means responsive to the rotation of said pressure-applying rollers when said sheet material is advanced therebetween causing said rotary means to be rotated in another direction against the bias of said resilient means, means for controlling the angle of rotation of said rotary means in said other direction, said means for controlling the angle of rotation of said rotary means in said other direction being responsive to variations in temperature for varying said angle of rotation inversely as the temperature, escapement means for controlling the rate of rotation of said rotary means in said one direction under the bias of said resilient means, and means indicating to the operator of said camera when said processing period has elapsed.

9. In a photographic apparatus for exposing and processing photosensitive sheet material, means defining a chamber into which said sheet material may be advanced during processing, door means providing access to said chamber, timing means for measuring a predetermined period during which said sheet material is processed within said chamber, said timing means including a movable member displaceable against the bias of a spring, the length of said period measured by said timing means being a function of the extent of displacement of said movable member, means responsive to the movement of said sheet material through said apparatus for displacing said movable member, control means responsive to variation in temperature for varying the extent of displacement of said movable member inversely as the temperature, and means retaining said door means in closed position until said processing period has elapsed.

10. In a photographic apparatus for exposing and processing photosensitive sheet material, means defining a chamber into which said sheet material may be advanced during processing, door means providing access to said chamber, timing means for measuring a predetermined period during which said sheet material is processed within said chamber, said timing means being mounted on said door means and including a movable member displaceable against the bias of a spring, the length of said period measured by said timing means being a function of the extent of displacement of said movable member, means responsive to the movement of said sheet material through said chamber for displacing said movable member, and control means responsive to variation in temperature for varying the extent of displacement of said movable member inversely as the temperature.

11. In a photographic apparatus for exposing and processing photosensitive sheet material, timing means for measuring a predetermined period during which said sheet material is processed, said timing means including a movable member displaceable against the bias of a spring, the length of said period measured by said timing means being a function of the extent of displacement of said movable member, actuating means responsive to the movement of said sheet material through said apparatus for causing the displacement of said movable member, said actuating means including an engagement member for engaging a portion of said sheet material as it is advanced through said apparatus, and control means responsive to variation in temperature for varying the extent of displacement of said movable member inversely as the temperature, said control means including a member capable of withdrawing said engagement member from engagement with said portion of said sheet material.

References Cited in the file of this patent

UNITED STATES PATENTS

| | | |
|---|---|---|
| 1,816,290 | Klimis | July 28, 1931 |
| 2,117,279 | Anson | May 17, 1938 |
| 2,440,314 | Turner | Apr. 27, 1948 |
| 2,664,038 | Canham | Dec. 29, 1953 |